(12) United States Patent
Lee et al.

(10) Patent No.: US 7,325,406 B2
(45) Date of Patent: Feb. 5, 2008

(54) COOLING SYSTEM FOR COMPUTER

(75) Inventors: Tsung-Lung Lee, Tu-Cheng (TW); Zhi-Gang Liu, Shenzhen (CN)

(73) Assignees: Fu Zhun Precision Industry (Shenzhen) Co., Ltd., Bao'an District, Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 302 days.

(21) Appl. No.: 11/244,746

(22) Filed: Oct. 6, 2005

(65) Prior Publication Data

US 2007/0079615 A1 Apr. 12, 2007

(51) Int. Cl.
*F25B 21/02* (2006.01)
*F25D 23/12* (2006.01)
*F28D 15/00* (2006.01)
*H05K 7/20* (2006.01)

(52) U.S. Cl. .......... 62/3.2; 62/259.2; 165/104.33; 361/697

(58) Field of Classification Search ............... 62/3.2, 62/3.3, 3.6, 3.7, 259.2; 165/80.3, 104.33; 361/687, 695, 697
See application file for complete search history.

(56) References Cited

U.S. PATENT DOCUMENTS

| | | | | |
|---|---|---|---|---|
| 5,655,375 A * | 8/1997 | Ju | .................. | 62/3.6 |
| 5,704,212 A * | 1/1998 | Erler et al. | .................... | 62/3.2 |
| 5,731,954 A * | 3/1998 | Cheon | ........................ | 361/699 |
| 6,003,319 A * | 12/1999 | Gilley et al. | .................. | 62/3.7 |
| 6,038,128 A * | 3/2000 | Hood et al. | ................. | 361/687 |
| 6,055,814 A | 5/2000 | Song | | |
| 6,166,907 A * | 12/2000 | Chien | ........................ | 361/699 |
| 6,196,003 B1 * | 3/2001 | Macias et al. | ................ | 62/3.7 |
| 6,234,240 B1 | 5/2001 | Cheon | | |
| 6,542,361 B2 * | 4/2003 | Paradis | ....................... | 361/687 |
| 6,650,536 B2 | 11/2003 | Lee et al. | | |
| 6,725,682 B2 * | 4/2004 | Scott | ......................... | 62/259.2 |
| 6,854,275 B2 * | 2/2005 | Evans | .......................... | 62/3.2 |
| 7,174,738 B2 * | 2/2007 | Scott | ......................... | 62/259.2 |
| 7,190,576 B2 * | 3/2007 | Wang et al. | ................ | 361/687 |
| 2003/0110779 A1 * | 6/2003 | Otey et al. | .................... | 62/3.2 |
| 2005/0068733 A1 | 3/2005 | Squillante | | |

FOREIGN PATENT DOCUMENTS

JP 3-192799 A * 8/1991

* cited by examiner

*Primary Examiner*—Mohammad M. Ali
(74) *Attorney, Agent, or Firm*—Morris Manning Martin LLP; Tim Tingkang Xia, Esq.

(57) ABSTRACT

A cooling system (200) for a computer system (100) includes a housing (220) and a thermoelectric module (240) in the housing. The housing is hermetically connected to a computer case (120). The thermoelectric module comprises a cold side (242) and a hot side (244) when subject to an electric voltage. A first fan (300) is for blowing hot air generated by a CPU (50) in the computer case to the cold side of the thermoelectric module. A second fan (400) is for blowing cold air from the cold side of the thermoelectric module to the CPU. A first heat sink (250) is mounted to the cold side of the thermoelectric module. A second heat sink (260) is mounted to the hot side of the thermoelectric module.

17 Claims, 6 Drawing Sheets

COOLING SYSTEM FOR COMPUTER

BACKGROUND

1. Field

The present invention relates to a cooling system, and particularly to a cooling system for a hermetical computer system having a thermoelectric chip therein, wherein heat generated by heat-generating components in the computer system is cooled by the thermoelectric chip.

2. Prior Art

As is widely known, a computer system, generally has heat sources such as CPU, MOS, a power supply or other computer components. The heat sources generate heat which, if not dealt with, increases the temperature in the computer system. High temperature can reduce the performance of the components of the system and even shorten the useful life of the components.

Thus, a cooling system is often provided to the computer system to remove the heat generated by the heat sources.

In this respect, conventional computer systems are cooled by either positive pressure cooling technology or negative pressure cooling technology. The positive pressure cooling technology forcibly draws cold air into the system from the outside. On the other hand, negative pressure cooling technology establishes a negative pressure in the system by exhausting hot air from the system, whereby cold air is induced into the system from the outside.

The computer systems which can be cooled by the positive and the negative pressure cooling technologies need to be open systems, meaning that these systems allow some physical object, i.e., air, to be moved under pressure out of the systems.

Systems employing the negative and positive pressure cooling technologies are illustrated in FIGS. 5 and 6, respectively.

Referring to FIGS. 5 and 6, a computer system 12' comprises a computer case 10 having a CPU 8 therein. Heat generated by the CPU 8 is exhausted out of the computer case 10 by a cooling fan 6. More particularly, the computer case 10 comprises at least two ports 10a and 10a'. One of the two ports is an intake port and the other is an exhaust port. Cold air is taken into the computer case 10 from outside through the intake port. The intake cold air is mixed with hot air in the computer case 10 and then is forced out of the computer case 10 through the exhaust port.

In the computer system 12' employing the negative pressure technology, the cooling fan 6 is mounted in the exhaust port 10a' as shown in FIG. 5. In the computer system 12' employing the positive pressure cooling technology, the cooling fan 6 is mounted in the intake port 10a' as shown in FIG. 6.

When the cooling fan 6 operates, negative pressure is created in the computer system 12' and cold air is induced into the computer system 12' from outside as shown in FIG. 5, or cold air is forcibly drawn into the system 10 from outside as shown in FIG. 6. As a result, the computer system is cooled.

In this type of open computer system, cold air must be introduced into the system from outside. However, fibrous materials and conductive particles may be introduced into the system together with the cold air. Such fibrous materials and conductive particles can accumulate on wires of electric components and semiconductor packages etc. mounted on a printed circuit board installed in the computer system. The accumulated fibrous materials and conductive particles can increase electrical resistance of the wires, or shorten the wires, whereby the performance of the electronic components deteriorates, or even the electronic components break down.

Thus, it is desired to devise a hermetical computer system which prevents contaminants from entering the system.

SUMMARY

Accordingly, what is needed is a hermetical computer system having a cooling system.

According to an embodiment of the present invention, a computer system is closed from surrounding atmosphere so that dust in the surrounding atmosphere cannot enter the computer system to contaminate electronic components therein. The computer system includes a cooling system consisting of a housing for hermetically coupled to a computer case of the computer system. The housing comprises a lateral wall having a lower protrusion and an upper protrusion. A thermoelectric module is received in the housing and has a cold side and a hot side when subject to an electric voltage. The computer case comprises a CPU therein and a side panel having a lower opening and an upper opening. A first fan mounted to the upper opening is connected with the upper protrusion for blowing hot air generated by the CPU to the cold side of the thermoelectric module. A second fan mounted to the lower opening is connected with the lower protrusion for blowing cold air from the cold side of the thermoelectric module to the CPU. A first heat sink is mounted to the cold side of the thermoelectric module for facilitating absorption of heat from the hot air to the cold side of the thermoelectric module. A second heat sink is mounted to the hot side of the thermoelectric module for facilitating dissipation of the heat from the hot side of the thermoelectric module to the surrounding atmosphere.

Other advantages and novel features of the present invention will become more apparent from the following detailed description when taken in conjunction with the accompanying drawings, in which:

DETAILED DESCRIPTION OF THE PREFERRED EMBODIMENTS

Figure 1:
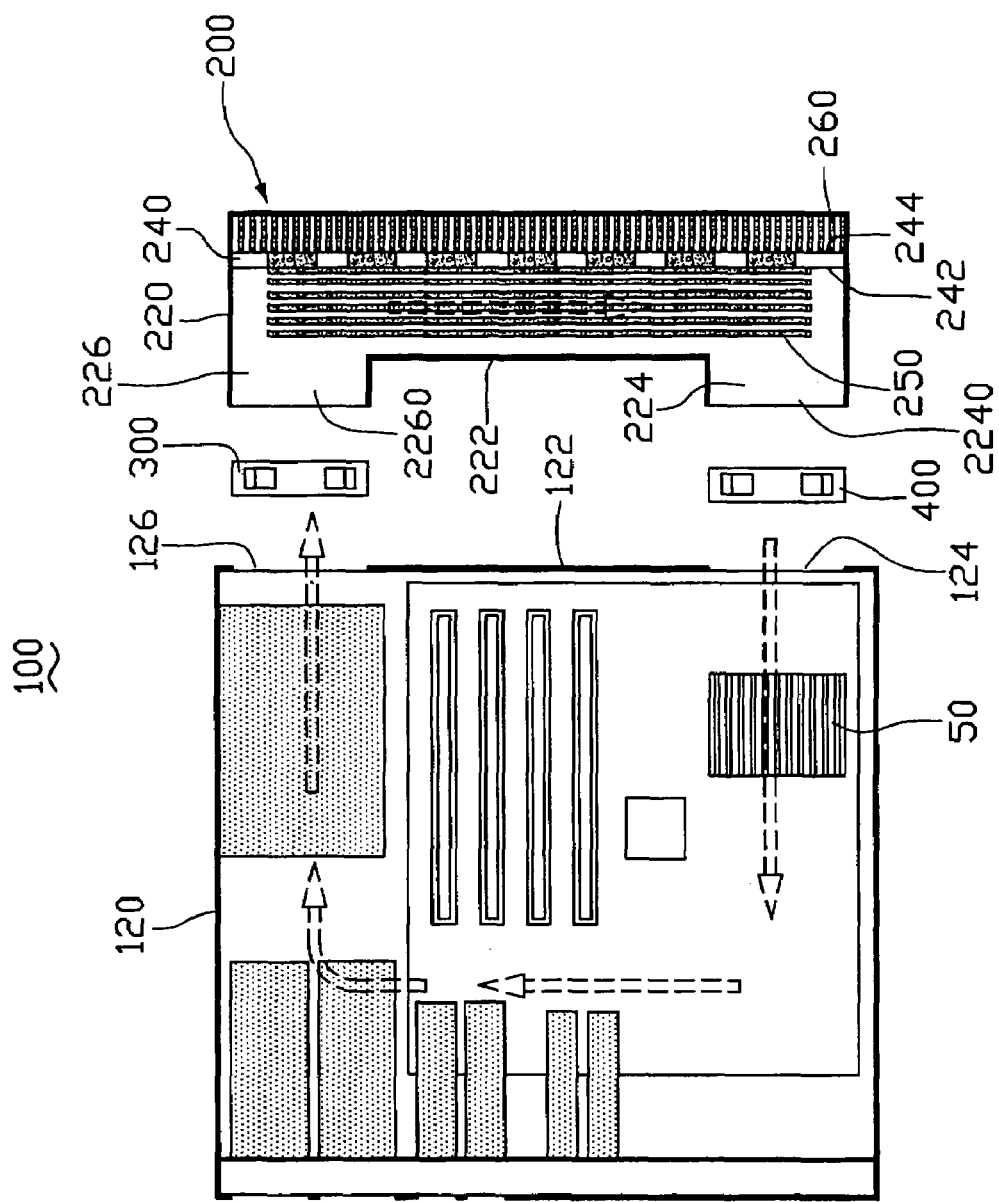
FIG. 1 is an exploded, schematic view of a computer system having a cooling system in accordance with a first preferred embodiment of the present invention.

FIG. 1 shows a computer system 100 comprising a casing 120 in which a heat generating component, CPU 50 is disposed, and a cooling system 200. The casing 120 comprises a side panel 122. The side panel 122 defines a lower opening 124 and an upper opening 126 respectively at bottom and top ends thereof. A first fan 300 and a second fan 400 are respectively received in the upper and lower openings 126, 124. The cooling system 200 comprises a housing 220, a thermoelectric module 240, a first heat sink 250 and a second heat sink 260. The housing 220 comprises a lower protrusion 224 corresponding to the lower opening 124 of the casing 120 and an upper protrusion 226 corresponding to the upper opening 126 of the casing 120. The housing 220 further comprises a lateral wall 222 connecting the lower protrusion 224 and the upper protrusion 226. The lateral wall 222 is located facing the side panel 122 of the casing 120. The lower protrusion 224 and the upper protrusion 226 respectively have apertures 2240, 2260 communicating with the lower opening 124 and the upper opening 126 of the casing 120, respectively. The thermoelectric module 240 comprises a cold side 242 and a hot side 244. The first heat sink 250 is attached to the cold side 242 of the thermoelectric module 240. The second heat sink 260 is attached to the hot side 244 of the thermoelectric module 240. The thermoelectric module 240 is also called thermoelectric cooling module, which uses the Peltier effect to create a heat flux between the junction of two different types of materials. Such technology and product are well known to those skilled in the art. When the thermoelectric module 240 is applied with an electric voltage, heat flows from an inner side, i.e., the cold side 242, to an outer side, i.e., the hot side 244 of the thermoelectric module 240.

Figure 2:
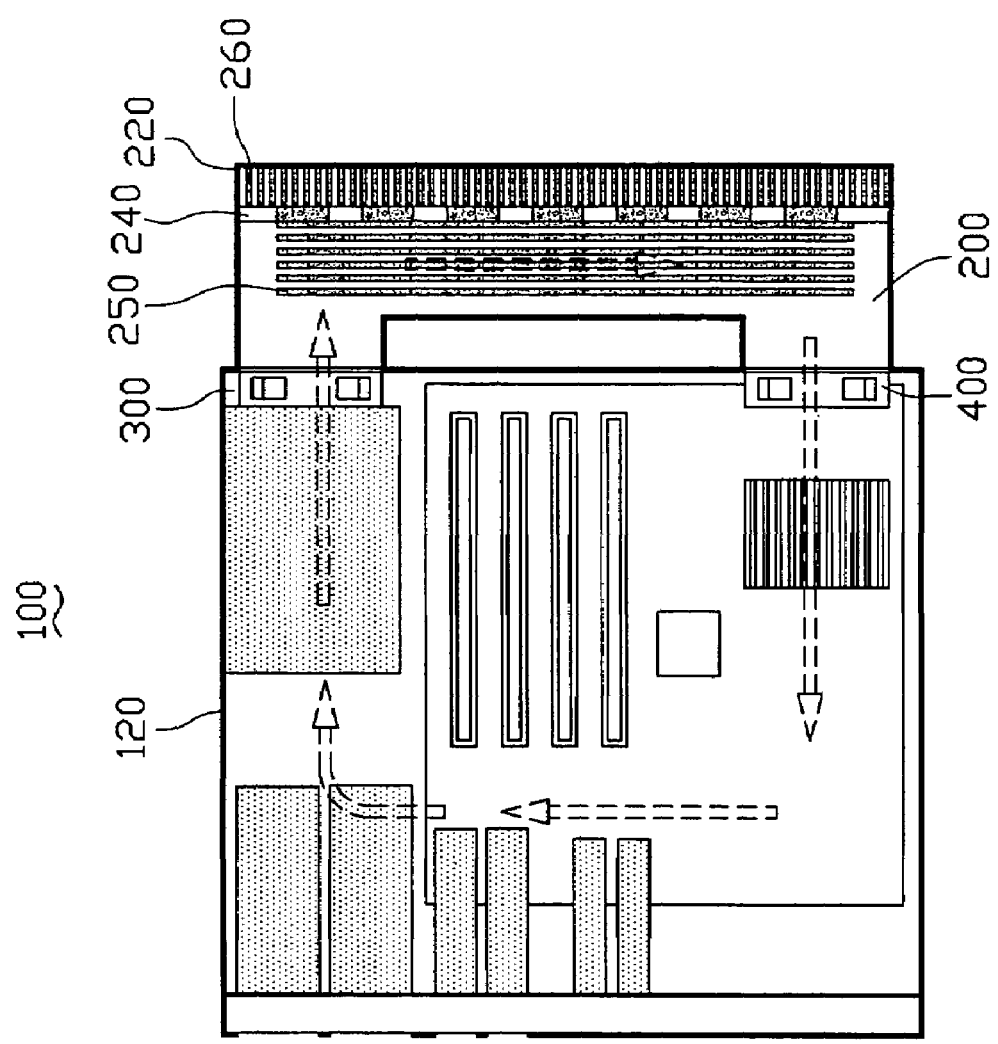
FIG. 2 is an assembled view of FIG. 1.

Referring also to FIG. 2, in assembly of the computer system 100, the lower protrusion 224 and the upper protrusion 226 of the housing 220 of the cooling system 200 are respectively engaged in the lower opening 124 and the upper opening 126 of the casing 120 such that the cooling system 200 is coupled to the casing 120. The housing 220 and the casing 120 are hermetically connected together, which means that the computer system 100 such formed can prevent outside foreign tiny articles from entering the computer system 100. Thus, contamination of electronic components of the computer system 100 by dust and fibrous materials and conductive particles outside the computer system 100 is avoided.

When the computer system 100 operates, the CPU 50 begins to generate heat. The heat flows through the upper opening 126 and the first fan 300. The first fan 300 generates an airflow to draw the heat to the cooling system 200 through the upper aperture 2260 of the housing 220 of the cooling system 200. The first heat sink 250 and the cold side 242 of the thermoelectric module 240 absorb the heat. The heat is transferred from the cold side 242 to the hot side 244 of the thermoelectric module 240 and then dissipated by the second heat sink 260 to surrounding atmosphere. After passing through the first heat sink 250 and the cold side 242, the heat of the airflow is dissipated and the temperature thereof is lowered. Thus, the airflow becomes a cold airflow. The cold airflow from the first heat sink 250 and the cold side 242 of the thermoelectric module 240 is driven by the second fan 400 to enter the casing 120 via the lower aperture 2240 of the housing 220 and the lower opening 124 of the casing 120. The cold airflow then flows through the CPU 50 to thereby take the heat generated by the CPU 50 away from the CPU 50 for next cooling process.

Figure 3:
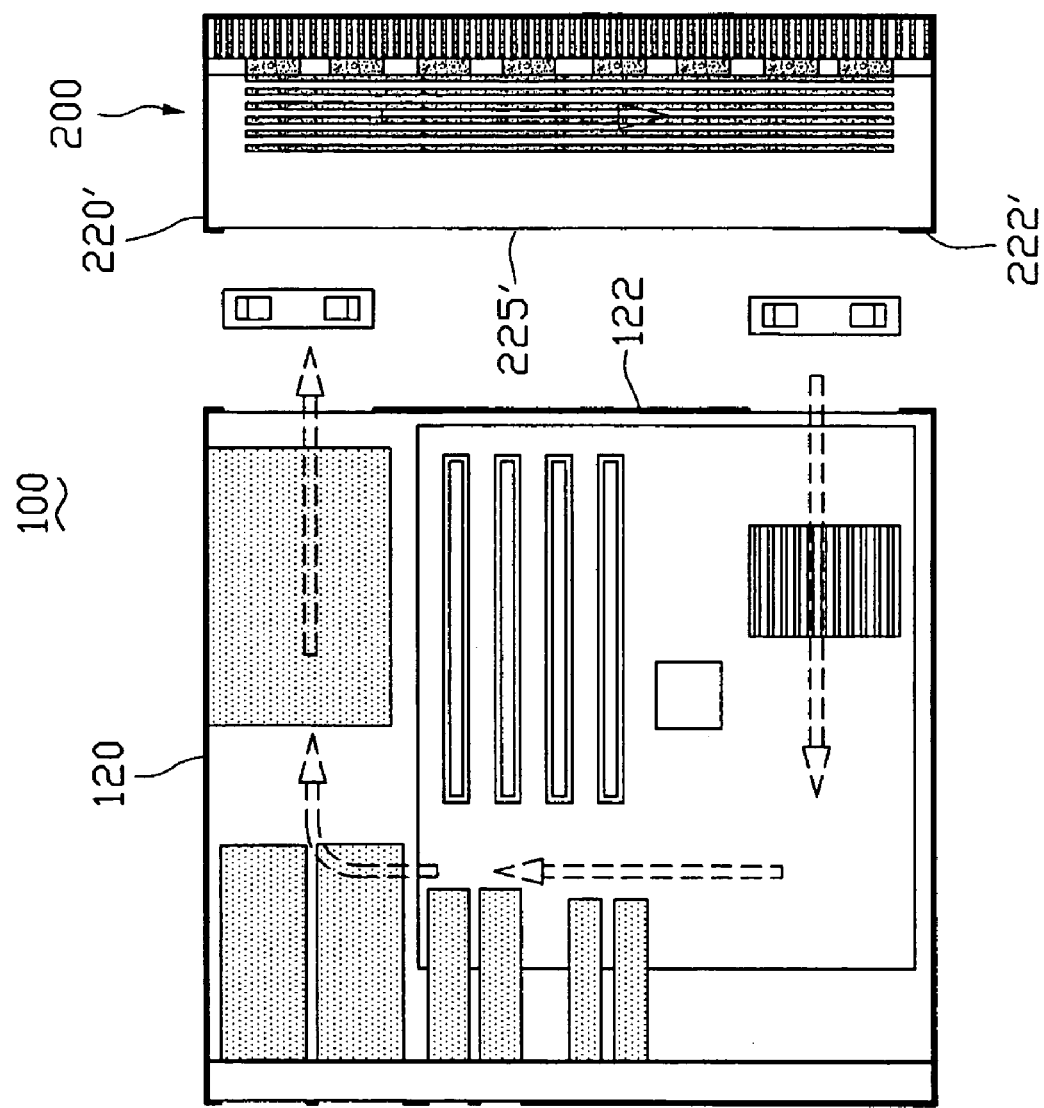
FIG. 3 is an exploded, schematic view of a computer system having a cooling system in accordance with a second preferred embodiment of the present invention.
Figure 4:
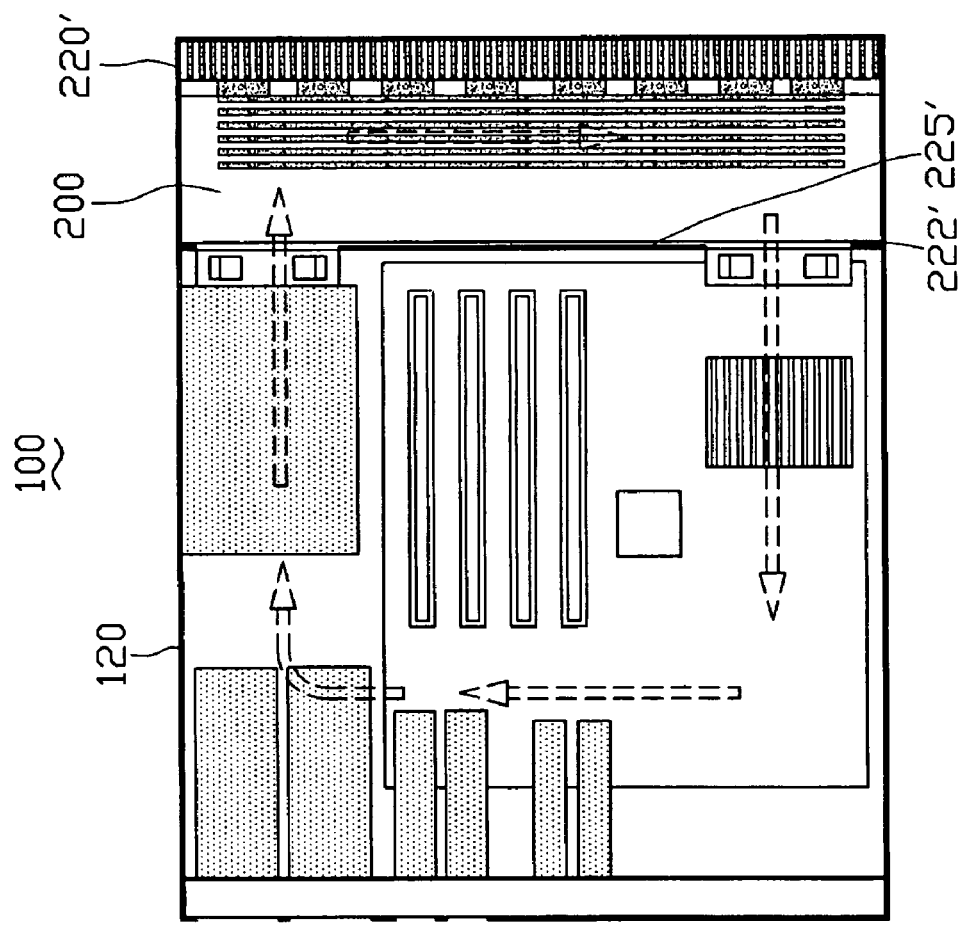
FIG. 4 is an assembled view of FIG. 3.
Figure 5:
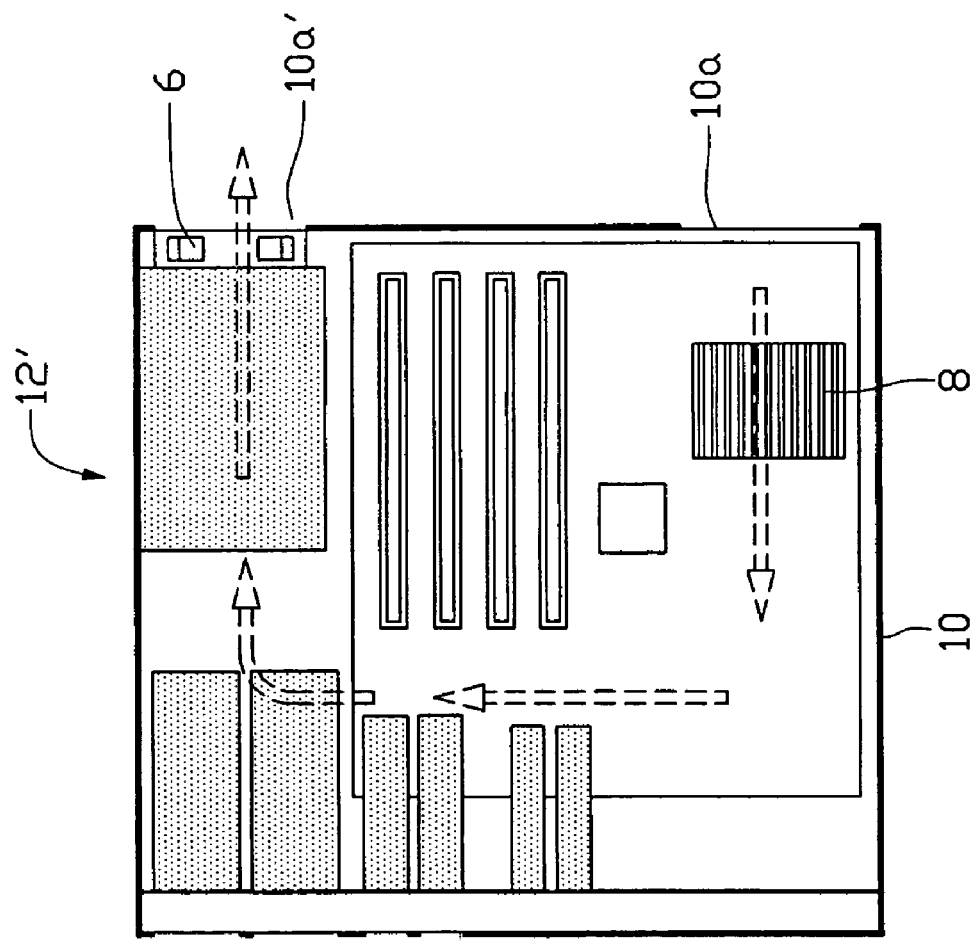
FIG. 5 is a schematic view of a conventional open computer system employing conventional negative pressure cooling technology.
Figure 6:
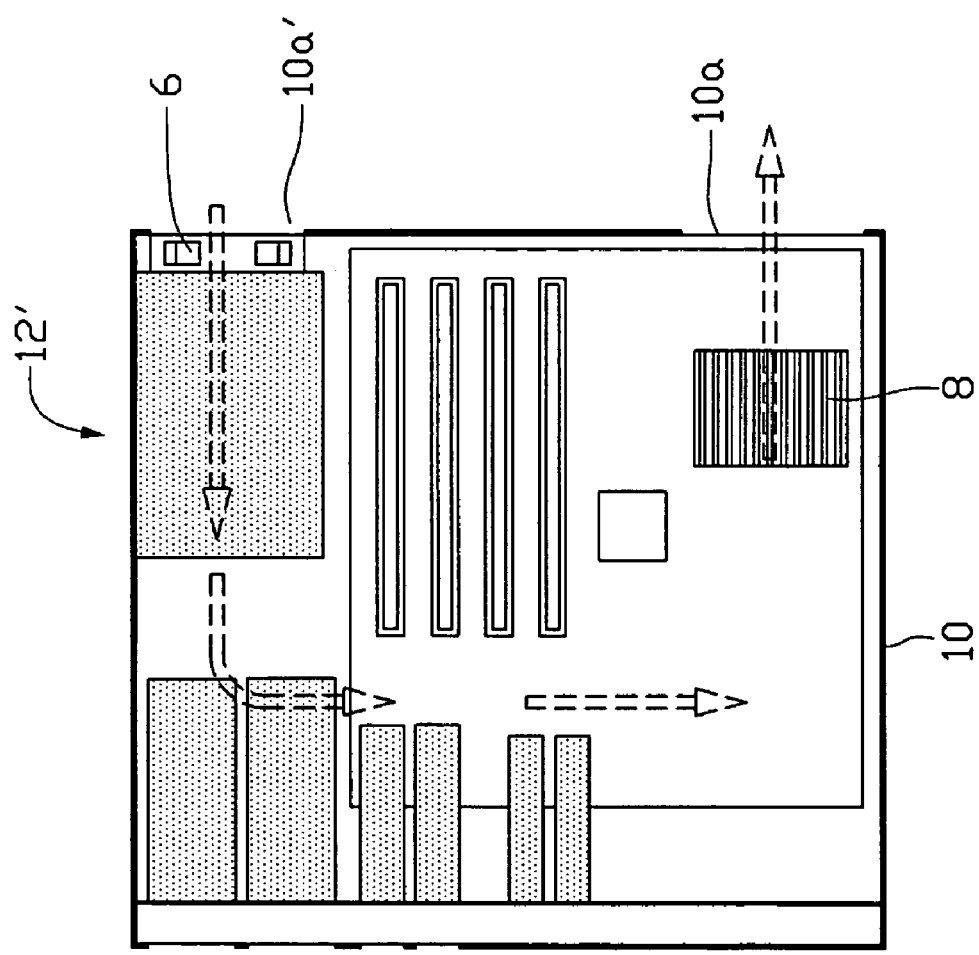
FIG. 6 is a schematic view of a conventional open computer system employing conventional positive pressure cooling technology.

FIGS. 3-4 show a computer system having a cooling system in accordance with a second preferred embodiment of the present invention. The computer system of the second preferred embodiment is similar with that of the first preferred embodiment. However, a housing 220' replaces the housing 220 of the first embodiment. The housing 220' defines an opening 225' at a lateral wall 222' thereof. The lateral wall 222' of the housing 220' is hermetically engaged with the side panel 122 of the casing 120 such that the cooling system 200 is coupled to the casing 120 to form the computer system 100 which is sealed from outside foreign tiny articles, such as dust, fibrous materials and conductive particles.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A cooling system for a computer system having a computer case receiving a heat-generating electronic component therein, comprising:

a housing adapted to be coupled to the computer case, having a lower protrusion and an upper protrusion;

a thermoelectric module received in the housing, having a cold side and a hot side when the thermoelectric module is subjected to an electric voltage;

a first fan for blowing hot air generated by the heat-generating electronic component in the computer case to the cold side of the thermoelectric module via an aperture defined by the upper protrusion;

a second fan for blowing cold air from the cold side of the thermoelectric module to the heat-generating electronic component via an aperture defined by the lower protrusion;

a first heat sink mounted to the cold side of the thermoelectric module; and a second heat sink mounted to the hot side of the thermoelectric module.

2. The cooling system of claim 1, wherein the computer case comprises a side panel having a lower opening and an upper opening respectively corresponding the lower protrusion and the upper protrusion of the housing of the cooling system.

3. The cooling system of claim 2, wherein the lower protrusion and the upper protrusion of the housing of the cooling system respectively are engaged in the lower opening and the upper opening of the side panel of the computer case.

4. The cooling system of claim 2, wherein the housing of the cooling system comprises a lateral wall defining the lower protrusion and the upper protrusion, and the lateral wall is engaged with the side panel of the computer case.

5. The cooling system of claim 1, wherein the housing of the cooling system is hermetically coupled to the computer case for preventing dust from entering the computer system.

6. A hermetical computer system comprising:

a computer case comprising a heat-generating electronic component, a side panel having a lower opening and an upper opening, a first fan received in the upper opening and a second fan received in the lower opening; and a cooling system coupled to the computer case, comprising a housing having a lateral wall engaged with the side panel of the computer case, the lateral wall having at least one aperture communicating with the computer case via the lower opening and the upper opening, a thermoelectric module received in the housing and having a cold side and a hot side when subject to an electric voltage, a first heat sink mounted to the cold side of the thermoelectric module and a second heat sink mounted to the hot side of the thermoelectric module; wherein the first fan blows hot air generated by the heat-generating electronic component to the cold side of the module thermoelectric and the second fan blows cold air from the cold side of the thermoelectric module to the heat-generating electronic component.

7. The hermetical computer system of claim 6, wherein the lateral wall of the housing of the cooling system comprises a lower protrusion having an aperture and an upper protrusion having an aperture, and the lower protrusion and the upper protrusion respectively are engaged in the lower opening and the upper opening of the side panel of the computer case.

8. A computer system, comprising:
a casing comprising a heat-generating electronic component therein;
a housing hermetically connected to the casing, comprising a thermoelectric module therein, the thermoelectric module having a cold side and a hot side when subjected to an electric voltage;
a fan located substantially between the casing and the housing, the fan generating an airflow which takes heat from the heat-generating electronic component to the cold side of the thermoelectric module.

9. The computer system of claim 8 further comprising a heat sink thermally contacting with the cold side of the thermoelectric module.

10. The computer system of claim 8 further comprising a heat sink thermally contacting with the hot side of the thermoelectric module.

11. The computer system of claim 9 further comprising an additional heat sink thermally contacting with the hot side of the thermoelectric module.

12. The computer system of claim 8, wherein the casing defining two openings adjacent to the housing, and the first fan is located in one of the two openings.

13. The computer system of claim 12 further comprising another fan located in the other of the two openings, the second fan facilitating the airflow generated by the first fan to flow through the heat-generating electronic component.

14. The computer system of claim 13, wherein the housing forms two protrusions fitting in the two openings of the casing.

15. The computer system of claim 14 further comprising a first heat sink attached to the cold side and a second heat sink attached to the hot side of the thermoelectric module.

16. The computer system of claim 13, wherein the housing defining an opening communicating with the two openings of the housing.

17. The computer system of claim 16 further comprising a first heat sink attached to the cold side and a second heat sink attached to the hot side of the thermoelectric module.

* * * * *